March 31, 1925.
M. B. LOOMIS ET AL
BRICK MOLDING MACHINE
Filed Sept. 29, 1923
1,531,296
2 Sheets-Sheet 1
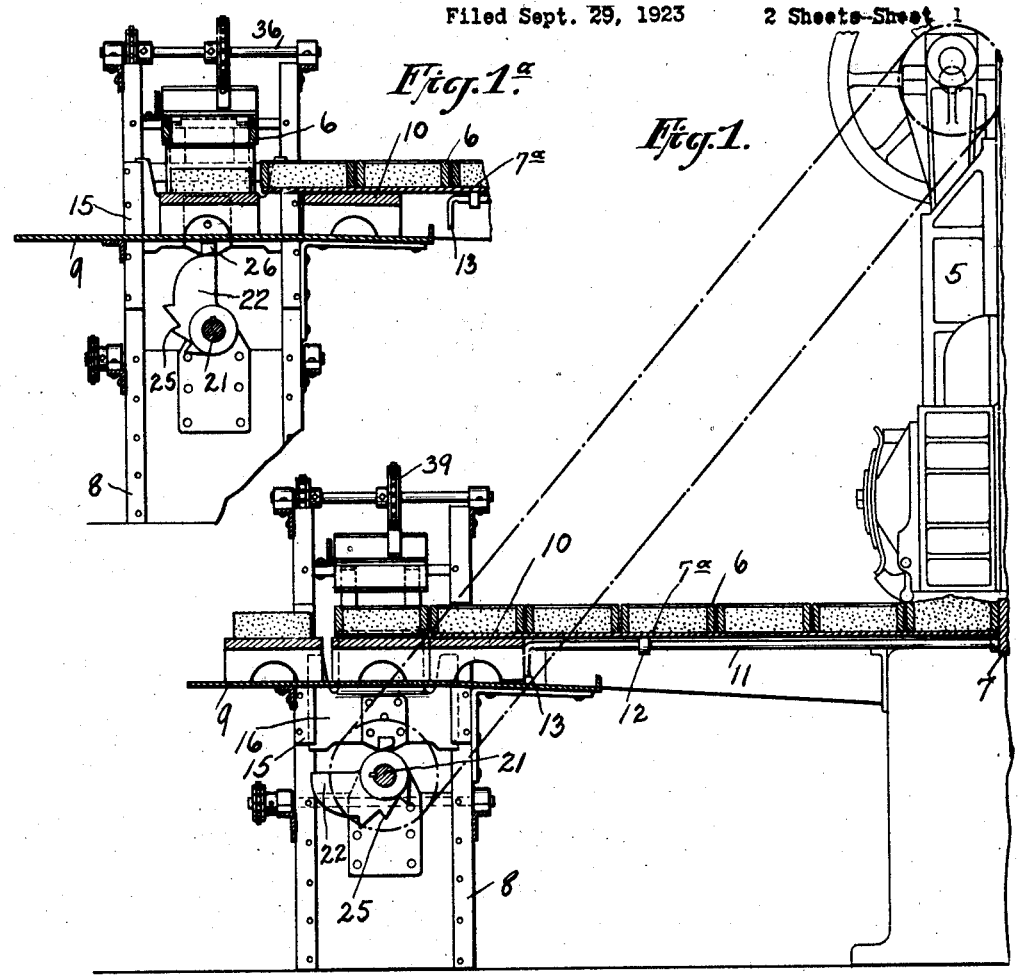
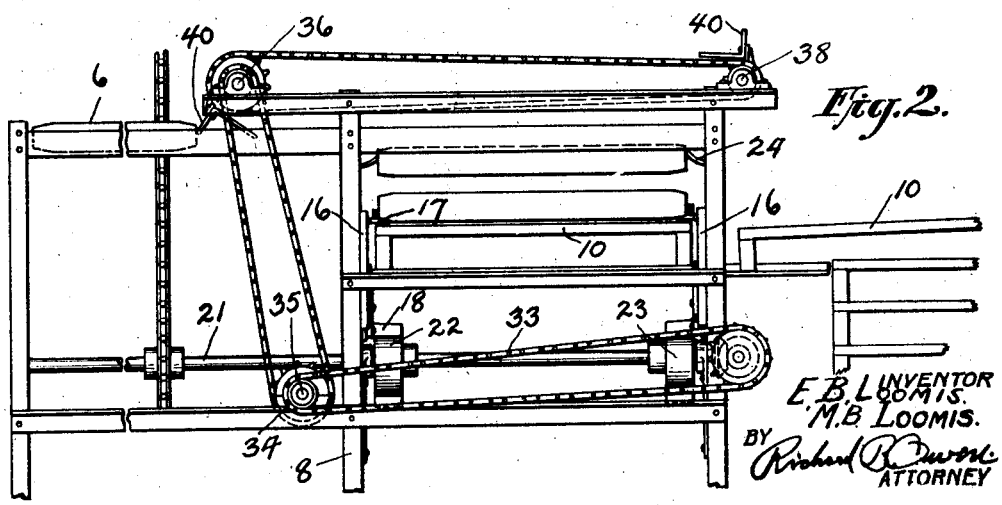

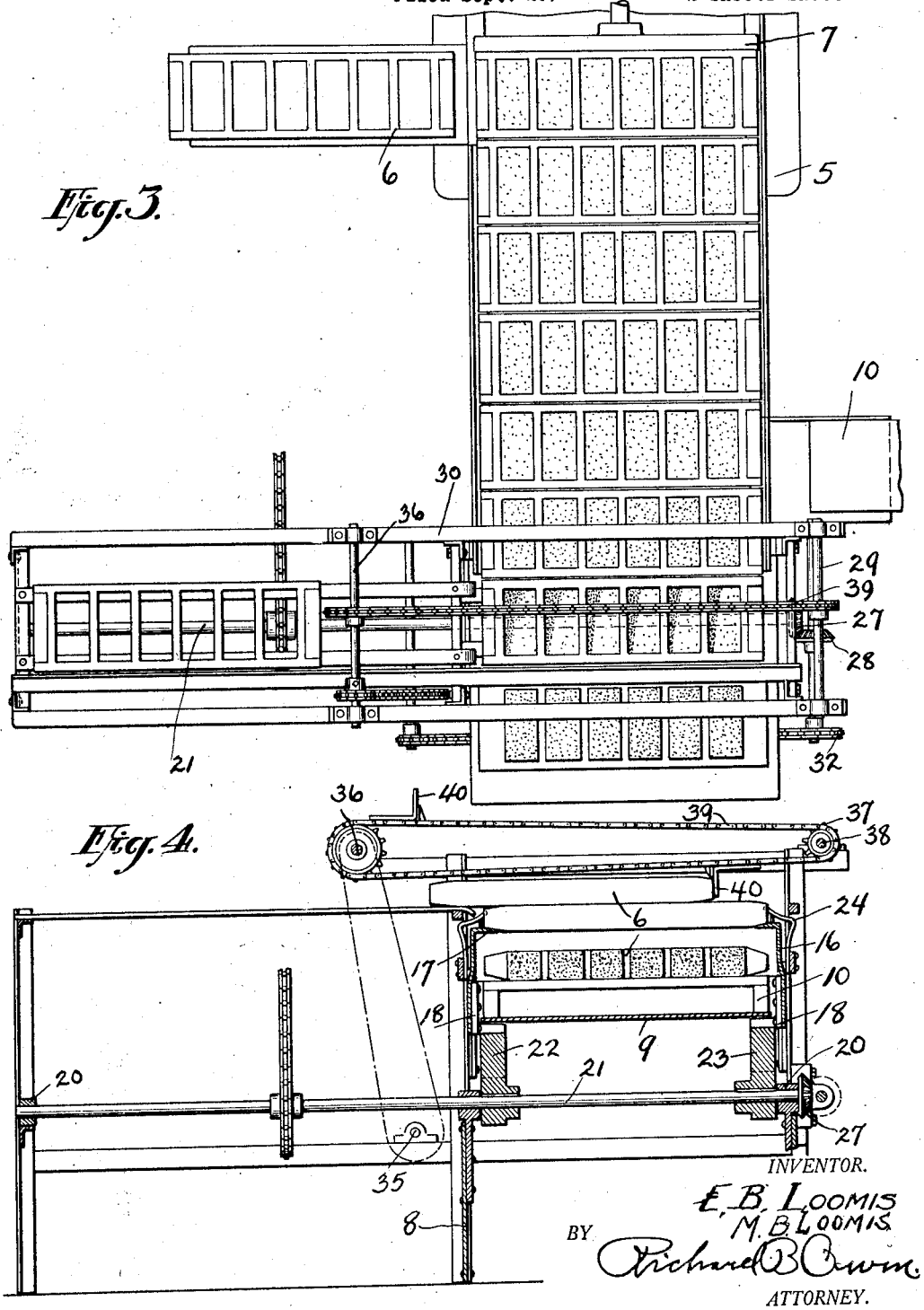

Patented Mar. 31, 1925.

1,531,296

UNITED STATES PATENT OFFICE.

MAURICE BRYAN LOOMIS AND EDWARD BURROWS LOOMIS, OF SHERBROOKE, QUEBEC, CANADA.

BRICK-MOLDING MACHINE.

Application filed September 29, 1923. Serial No. 665,708.

*To all whom it may concern:*

Be it known that we, MAURICE BRYAN LOOMIS and EDWARD BURROWS LOOMIS, subjects of the King of England, residing at Sherbrooke, in the Province of Quebec and Dominion of Canada, have invented certain new and useful Improvements in Brick-Molding Machines, of which the following is a specification.

This invention relates to brick making machinery and more particularly to a novel and improved mechanism for ejecting the moulded bricks from bottomless moulds as the same are successively delivered at the end of the soft mud brick machine, now well known in the art.

One of the objects of our invention is to provide a novel and improved mechanism adapted to be utilized in connection with any soft mud brick machine wherein pallets may be positioned beneath the delivery table of the bottomless moulds as they are pushed forwardly, including provision for intermittently jarring the said moulds so as to free the green brick therefrom and deposit said bricks on the pallet, the latter being subsequently removed from the end of the delivery table.

Another object of invention is to provide a novel and improved mechanism to be utilized in connection with a soft mud brick machine wherein the pallet may be positioned beneath the delivery table to receive the green bricks after the same are jarred or loosened from the mould including provision for intermittently lifting said moulds and conveying the same to one side of the mechanism whereby the said bottomless moulds may be again introduced to the delivery table of the soft mud machine.

To enable others skilled in the art to fully comprehend the underlying features of our invention that they may embody the same in the various modifications in structure and relation of parts contemplated, drawings depicting a preferred form have been annexed as a part of this disclosure and in such drawings, similar reference characters denote corresponding parts throughout the several views, of which—

Figure 1 is a side view partly in section showing a soft mud brick machine in its relation to the plate on the delivery table and the pallets on which the bottomless moulds are fed.

Figure 1ª is a fragmentary view in section of the plate on the delivery table showing the mechanism for raising the bottomless moulds and freeing the green bricks on the pallets.

Figure 2 is an end view of the mechanism showing the delivery of the bottomless moulds after the green bricks have been deposited on the pallet.

Figure 3 is a plan.

Figure 4 is an end view partly in section showing the lifting plates and cams in their relation to the bottomless moulds and pallets.

Referring now to the drawings, wherein like reference characters designate corresponding parts throughout the several views, 5 designates generally a power driven, soft-mud brick machine and 6 a mold, constructed without a top or bottom, containing one or more sections, the size of a brick of any desired shape, and which we have designated as a bottomless mold to be fed and receive the clay or material whereby the brick is shaped. A mould push or mould carrier is adapted to be reciprocated to engage the end moulds so as to thrust the same forwardly on the delivery table whereby the next mould may be inserted.

Positioned and secured on the top of the mould delivery table 7ª of the soft mud machine is a heavy mould plate, having guards and guides of angle iron secured or bolted on top of said plate so as to support and guide the bottomless molds and their contents during their travel from the time the empty molds are fed into the soft mud machine until they leave the end of the mold plate and are deposited on the pallet in the proper position preliminary to being engaged by the lifting device subsequently to be referred to. The above operation is effected by the reciprocating mold push or mold gage 7, clearly shown by Figs. 1 and 3 of the drawing.

Secured to the end of the soft mud machine dumping table, we have provided a pallet delivery table 9 adjusted by set screws at a point below the bottom of the mold delivery plate to accommodate and receive any form of pallet now in common practice. Attached to the operating mechanism of the soft mud machine or the mold push and gage, are two pallet push bars 11, one on each side, which are under the mold plate, and slidable in brackets or guides 13, which push and urge the pallets forwardly as they are fed into the side of the device in their proper position at the end of the mold plate and beneath the bottomless, filled molds, which are subsequently disengaged from the green bricks. The supporting structure 8 is provided with guide plates 15 and a pair of lifting plates 16, the upper end of said lifting plates being bent inwardly as indicated at 17 so as to engage the ends of the bottomless mold 6 as the same is fed forwardly on the pallet. The lifting plates 16 have attached thereto, L-shaped bars 18, preferably riveted or moulded to said lifting plates and movable therewith. The supporting structure 8 has mounted in suitable bearings 20, an operating shaft 21, driven by a sprocket and chain mechanism from the soft mud brick machine. A pair of cams 22, 23 operable with the shaft 21 are adapted to engage the L-shaped bars 18 so as to actuate the lifting plates whereby the bottomless molds 6 may be raised into engagement with the spring 24, secured to the supporting structure. The cams 22, 23, keyed on the shaft 21 are provided with teeth 25 which are adapted to engage a lug 26 on each of the lifting plates so that when the cams rise over the lugs, a shaking or jarring action will be imparted to the lifting plates and consequently to the molds 6 whereby the green bricks are loosened and deposited on the pallets 10. Since this action is intermittent due to the reciprocation of the pusher bar and the action of the cams, the pallets will be fed in timed relation so that the bottomless moulds will be engaged by the lifting plates to free the green bricks therefrom whereupon the pallet and the bricks may be removed from the end of the table 9 to the conveyor.

It will be observed that the shaft 21 is provided with a bevelled gear 27 which is in mesh with a bevelled gear 28 on the shaft 29, mounted in suitable bearings on the supporting structure and horizontally extending bars 30, as shown by Fig. 3 of the drawings. The shaft 29 also carries a sprocket and chain drive 32, 33, which sprocket is trained over a sprocket 34 on a second shaft 35. Shaft 35 drives the shaft 36 through suitable sprocket and chain gearing as further disclosed by Figures 2 and 4. An idler sprocket 37 mounted on a shaft 38 cooperates with the sprocket on the shaft 36 and supports the delivery sprocket 39. The sprocket 39 is provided with L-shaped wiper plates or bars 40 which are adapted to engage the ends of the bottomless molds as the same are pushed upwardly by the next succeeding mold and carries the same transversely and over on the sides of the supporting structure. The molds 6 being freed from the bricks, are then removed and again fed into the soft mud brick machine as above described.

It will be understood by those skilled in the art, that the operation of the cams are timed so that the lifting plates will engage the bottomless moulds only as the pallets are moved forward into position and after the molded bricks have been jarred loose and the smooth surface of the cams raise the lifting plates, the bottomless molds will be elevated and held in position by the springs 24 until the next mold engages the same. This is clearly shown in Fig. 4 wherein the green bricks have been deposited on the pallet and the mold raised, ready to be engaged by the conveyor. A filled mold, directly behind the green bricks is advanced by the pushing mechanism as the operation continues. The L-shaped wiper plates or bars 40 of course engage the ends of the bottomless molds as they are elevated, transferring them horizontally of the machine as shown by Figs. 3 and 4.

While we have illustrated and described our invention with some degree of particularity, we realize that in practice various alterations therein may be made. We therefore reserve the right and privilege of changing the form of the details of construction or otherwise altering the arrangement of the correlated parts without departing from the spirit of the invention or the scope of the appended claims.

Having thus described our invention, what we claim as new and desire to secure by United States Letters Patent is:—

1. In combination with the delivery table of a soft mud brick making machine and bottomless moulds therefor, a supporting structure adjacent the end of said table, pallets for receiving the filled moulds from the delivery table, a driven shaft, cams keyed on the shaft, teeth on each of the cams, lifting plates for engaging the moulds, lugs on said lifting plates cooperating with the teeth of the cams to jar the bricks free from the moulds and means for retaining the elevated moulds above the pallets.

2. In combination with the delivery table of a soft mud brick making machine and bottomless moulds therefor, a supporting structure adjacent the end of said table, pallets for receiving the filled moulds from the delivery table, reciprocating rods operable by the machine for advancing the pallets, a driven shaft, cams mounted on the shaft and operable therewith, teeth on the surface of the cams, lifting plates having lugs thereon engageable by the teeth of the cams to jar the bricks loose from the moulds, resilient elements for engaging the ends of the moulds when elevated by the cams above the pallets, and a conveying mechanism for transferring the free moulds.

In testimony whereof we affix our signatures in presence of two witnesses.

MAURICE BRYAN LOOMIS.
EDWARD BURROWS LOOMIS.

Witnesses:
W. E. LOOMIS,
E. B. WORTHINGTON.